United States Patent [19]

Betzler et al.

[11] Patent Number: 4,815,810

[45] Date of Patent: Mar. 28, 1989

[54] HOUSING FOR A FIBER OPTIC COMPONENT

[75] Inventors: Mark H. Betzler, McDaniel, Md.; Steven E. Swanson, Williamsport, Pa.

[73] Assignee: GTE Products Corporation, Stamford, Conn.

[21] Appl. No.: 141,817

[22] Filed: Jan. 11, 1988

[51] Int. Cl.⁴ .............................................. G02B 6/42
[52] U.S. Cl. .............................. 350/96.20; 350/96.21
[58] Field of Search ............... 350/96.20, 96.21, 96.22, 350/96.23

[56] References Cited

U.S. PATENT DOCUMENTS

| | | | |
|---|---|---|---|
| 4,134,641 | 1/1979 | Kao et al. | 350/96.21 |
| 4,183,615 | 1/1980 | Rush | 350/96.21 |
| 4,193,665 | 3/1980 | Arnold | 350/96.22 |
| 4,579,418 | 4/1986 | Parchet et al. | 350/96.20 |
| 4,636,034 | 1/1987 | Kashimura et al. | 350/96.21 |

*Primary Examiner*—John D. Lee
*Attorney, Agent, or Firm*—William H. McNeill

[57] ABSTRACT

A fiber optic component housing includes cushioning means for the component and strain relief for the fiber optic cable. The latter includes a two part subassembly attached to the cable and further includes means which engage ribs on the inside of the housing. The engaging means is an annular flange.

4 Claims, 2 Drawing Sheets

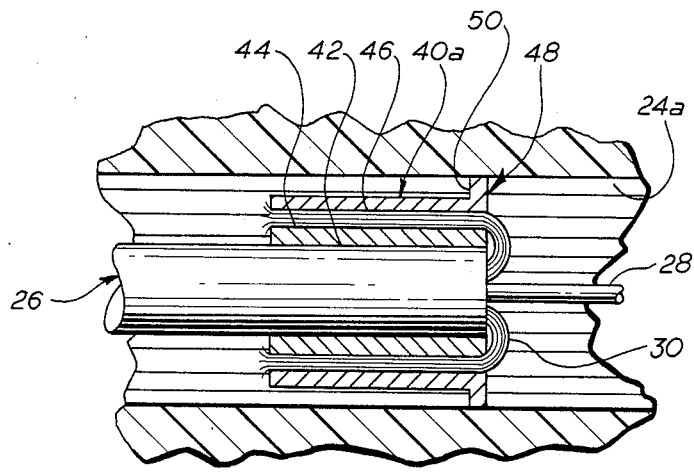
FIG. 4
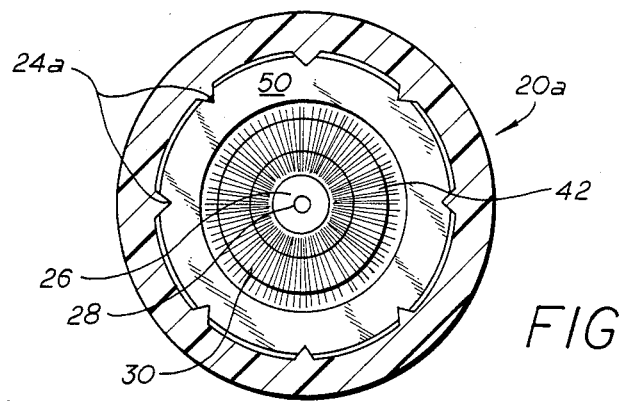
FIG. 2
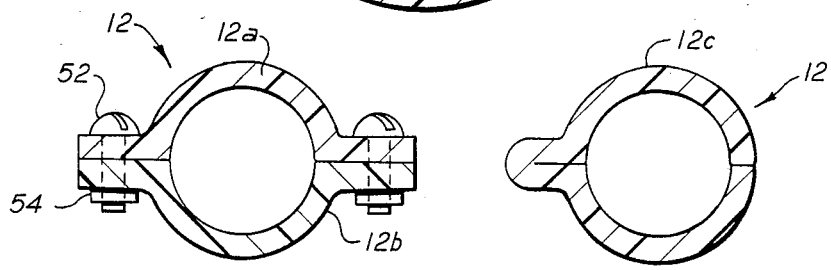
FIG. 5
FIG. 6
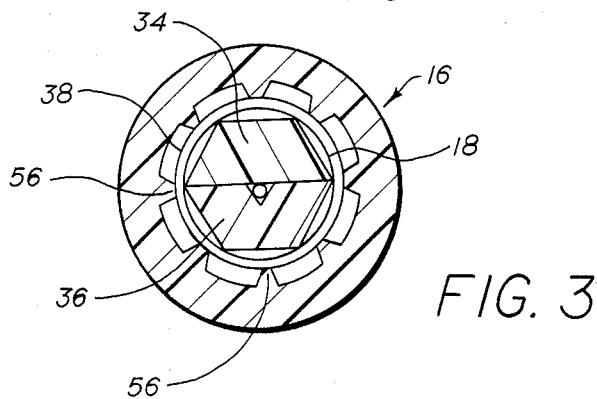
FIG. 3

HOUSING FOR A FIBER OPTIC COMPONENT

TECHNICAL FIELD

This invention relates to housings for fiber optic components, such as splices. More particularly, the invention relates to such housings which are re-usable and cooperate with sub-assemblies which provide strain relief for the enclosed component.

BACKGROUND ART

Various forms of splice housings have been proposed. Many either are not re-usable or do not provide strain relief. Among those that do provide strain relief, expense is generally great, as is inconvenience of use.

SUMMARY OF THE INVENTION

It is, therefore, an object of the present invention to obviate the disadvantages of the prior art.

It is another object of the invention to enhance component housings.

Still another object of the invention is the provision of a housing for a component which provides a cushioned mounting for the component and means for accommodating a sub-assembly which provides strain-relief for the component.

Yet other objects are to provide such a housing that is easy to use and economical to manufacture.

Further objects include the provision of a facile strain-relief subassembly.

The objects are accomplished, in one aspect of the invention, by a housing which has an elongated, substantially tubular body having a longitudinal axis. The body includes a first internal portion for mounting a component; e.g., a fiber optic splice, and a second internal portion which has an inner circumferential wall provided with a plurality of inwardly projecting radially spaced ribs having a given longitudinal extent measured along the longitudinal axis.

The strain-relief subassembly is employed with a radiation conducting cable, e.g., a fiber optic cable which comprises a core of e.g., glass, surrounded by a fibrous material having a covering material thereover. The subassembly is affixed to the cable and comprises a first tubular member having an inside diameter substantially matching the outside diameter of the covering material. The first tubular member, whose outer surface is roughened, is fitted over the cable. A given length of the fibrous material extends beyond the covering material and is folded back upon itself to engage the roughened surface of the first tubular member. A second tubular member is fitted over the fibrous material and the first tubular member and holding means co-acts between the second tubular member, the fibrous material and the first tubular member to form the subassembly.

The second tubular member also has engaging means formed thereon for cooperation with a surrounding housing.

BRIEF DESCRIPTION OF THE DRAWINGS

FIG. 2 is a sectional view taken along the line 2—2 of FIG. 1;

FIG. 3 is a sectional view taken along the line 3—3 of FIG. 1;

FIG. 4 is an enlarged sectional view of the strain-relief subassembly;

FIG. 5 is a sectional view of an embodiment of a housing; and

FIG. 6 is a sectional view of an alternate embodiment of a housing.

BEST MODE FOR CARRYING OUT THE INVENTION

Figure 1:
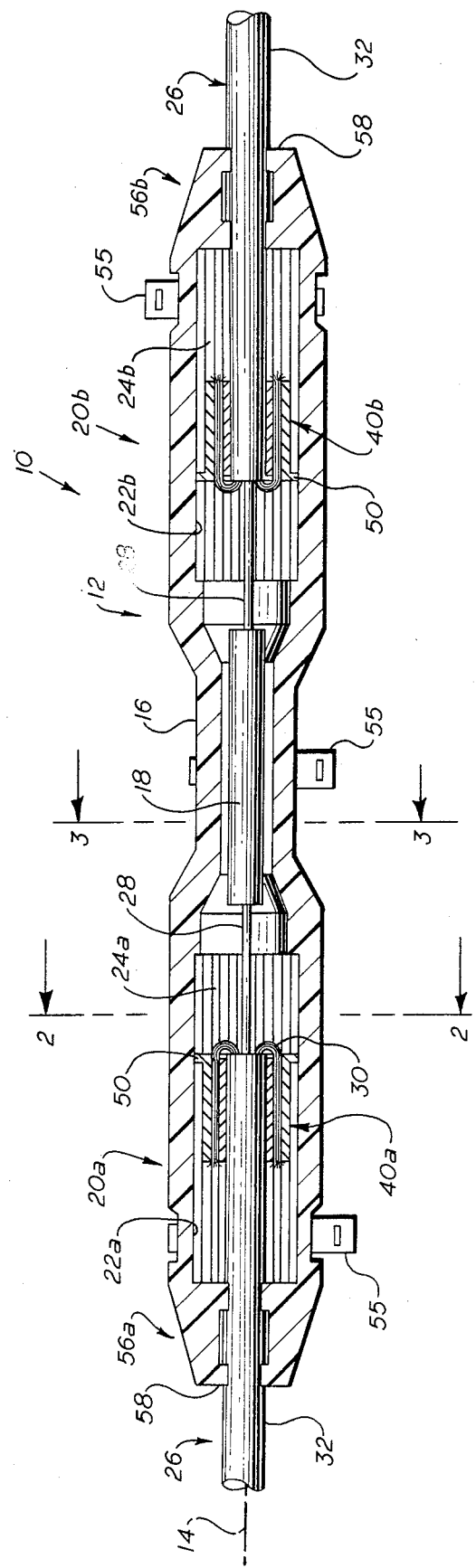
FIG. 1 is an elevational sectional view of a housing of the invention with a component and a strain-relief subassembly therein.

For a better understanding of the present invention, together with other and further objects, advantages and capabilities thereof, reference is made to the following disclosure and appended claims taken in conjunction with the above-described drawings.

Referring now to the drawings with greater particularity, there is shown in FIG. 1 a strain-relief, fiber optic component housing assembly 10 having an elongated, substantially tubular body 12 with a longitudinal axis 14. The body 12 has a first internal portion 16 for mounting a component 18; e.g., a fiber optic splice of the type shown in U.S. Pat. No. 4,257,674. The first internal portion is centrally located.

Second internal portions 20a and 20b are positioned on either side of central portion 16.

Each of the second internal portions has, respectively, an inner circumferential wall 22a, 22b, provided with a plurality of inwardly projecting, radially spaced ribs 24a, 24b. The ribs are preferably "V" shaped in cross-section and have a given longitudinal extent when measured along the longitudinal axis 14.

Optical fiber cables 26 are positioned in the housing body 12 substantially along the axis 14. A fibrous strength material 30, which can be woven Kevlar, surrounds the core and a covering material 32 surrounds the fibrous material.

The fibers 28 terminate in component 18, which as noted above, can be a splice of the type shown in U.S. Pat. No. 4,257,674 and comprising elastomeric portions 34, 36 enclosed in a glass tube 38 (see FIG. 3).

A pair of strain-relief subassemblies 40a and 40b are also provided. The subassemblies 40a and 40b each include a first tubular member 42 (seen most clearly in FIGS. 2 and 4) having an inside diameter matching the outside diameter of cable 26. The outside diameter 44 of member 42 is roughened, as by knurling. The member 42 is fitted over cable 26 and fibrous material 30 is folded thereover to engage the roughened surface 44. A second tubular member 46 has an inside diameter formed to fit over the fibrous material 30 and first tubular member 42 and is positioned thereover and fixed thereto, as by crimping. Engaging means 48 is provided at one end of second tubular member 42 and can be an annular flange 50.

To insure a firm bond between the first and second tubular members and the fibrous material, while insuring that the fiber 28 not be distorted, the first tubular member 42 is formed from a relatively non-compressible material, e.g., steel; and the second tubular member 46 is formed from a relatively compressible material, e.g., brass.

The housing assembly body 12, which can be a suitable plastic or hard rubber material, can be formed in two longitudinal halves 12a and 12b, as shown in FIG. 5, which can be joined by bolts 52 and nuts 54; or as a hinged assembly 12c such as is shown in FIG. 6. The latter assembly can be held together with plastic ties 55

(see FIG. 1) or, if environmental integrity is necessary, the halves can be cemented. Prior to joining the halves together, a fiber optic component 18 is placed within first internal portion 16 of tubular body 12 whereat it is cushioned by ribs 56 (see FIG. 3).

The strain-relief subassemblies 40a and 40b are fitted into the second internal portions 20a and 20b respectively, and the housing halves joined together. The joining forces the external edge of flanges 50 to penetrate the ribs 24a and 24b, thus providing strain relief for the enclosed component 18.

Additional strain relief can be provided by forming the terminal ends 56a and 56b with at least one cable biting portion 58, which can be in the form of a reduced diameter.

There is thus provided a new housing; a new strain-relief subassembly; and a new component housing assembly.

The strain is applied to the fibrous material during sustained pulls and stresses.

The housing is reusable, and the location of the strain-relief subassemblies on the cable is not critical so long as the flanges 50 will engage the crush ribs 24a and 24b.

The knurled first member allows the fibrous material to be displaced between the grooves, making an extremely tight and secure connection.

When the fiber optic component to be enclosed is a splice, the entire splice and strain-relief can be accomplished and then placed into the housing.

Accordingly, while there have been shown and described what are at present considered to be the preferred embodiments of the invention, it will be apparent to those skilled in the art that various changes and modifications can be made herein without departing from the scope of the invention as defined by the appended claims.

We claim:

1. A housing for a component, said housing having an elongated, substantially tubular body having a longitudinal axis, said body having a first internal portion for mounting said component, and a second internal portion having an inner circumferential wall and a given longitudinal length measured along said longitudinal axis and being provided with a plurality of inwardly projecting, radially spaced crush ribs having a longitudinal extent substantially equal to said given longitudinal length.

2. The housing of claim wherein said first internal portion has an inner circumferential wall provided with a plurality of inwardly projecting, radially spaced apart cushioning ribs having a longitudinal extent, measured along said longitudinal axis, sufficient to provide support for said component.

3. The housing of claim 2 wherein said ribs are triangular in cross-section.

4. The housing of claim 1 wherein said ribs are triangular in cross-section.

* * * * *